April 27, 1943. C. F. SHAFFER 2,317,412
MILITARY TANK
Filed Sept. 5, 1939 5 Sheets-Sheet 1

INVENTOR.
CLEVE F. SHAFFER

April 27, 1943. C. F. SHAFFER 2,317,412
MILITARY TANK
Filed Sept. 5, 1939 5 Sheets-Sheet 2

INVENTOR.
CLEVE F. SHAFFER

April 27, 1943.　　　C. F. SHAFFER　　　2,317,412
MILITARY TANK
Filed Sept. 5, 1939　　　5 Sheets-Sheet 3

INVENTOR.
CLEVE F. SHAFFER

April 27, 1943.　　　　C. F. SHAFFER　　　　2,317,412
MILITARY TANK
Filed Sept. 5, 1939　　　　5 Sheets-Sheet 4

Fig. 7.

INVENTOR.
CLEVE F. SHAFFER

April 27, 1943.   C. F. SHAFFER   2,317,412
MILITARY TANK
Filed Sept. 5, 1939   5 Sheets-Sheet 5

INVENTOR.
CLEVE F. SHAFFER

Patented Apr. 27, 1943

2,317,412

UNITED STATES PATENT OFFICE 2,317,412

MILITARY TANK

Cleve F. Shaffer, San Francisco, Calif.

Application September 5, 1939, Serial No. 293,369

7 Claims. (Cl. 89—40)

This invention relates to military tanks especially adaptable for employment in conjunction with infantry operations. As is well known, the primary purpose of all military tanks is as mobile armored fighting units, but a tank especially adapted for use of accompanying and operating in close conjunction with infantry should have special characteristics which have heretofore not been available in the ordinary tank.

It is obvious that a vehicle such as a tank that can combine in its activities several other military functions without in any way lessening its original effectiveness as a tank, offers superior and faster functioning to the commanders of any military force in meeting the defensive or offensive needs for specialized equipment under the changing conditions of battle, and also the elimination of large numbers of special purpose weapons and vehicles would relieve an army of much unnecessary detail, problems of supply, road congestion, etc., which hinders its effectiveness and speed, while relieving large numbers of men for other duties.

When the additional functions of a tank can comprise the transportation of troops, wounded, or ammunition without the necessity of adding or removing such parts as might limit a tank's ordinary effectiveness, or require much time to make such necessary alterations, it has exceptional value, and more especially if these incidental or alternative advantages or purposes are accomplished in an equal or better manner than by the ordinary methods.

Among the features which are desirable and advantageous in a modern military tank to accompany infantry operations, are greater comparative mobility for accompanying the infantry over all classes and conditions of terrain and topography, including ability to cross open holes, ditches and trenches of reasonable width; adaptability for mass or line production to provide an economical cost which will not make production in great numbers prohibitive, comparative lightness in weight in order to assure the possibility of air transport and a decrease of ground pressure per square inch of traction surface for purposes of mobility in soft ground, and the novel advantage light weight presents in allowing the tank to be hauled or pulled by relatively few men, or a military squad, over, through or out of excessively bad conditions of terrain where the tank's own motive power or traction is insufficient to completely do so, or in case of entire failure of motive power due to enemy fire or other causes.

It would be further advantageous if certain sections or assemblies of the tank were quickly detachable and thus manually transportable by from one to four men, thus still further lightening the tank so that it could be lifted, hauled, lowered, for immediate reassembly, to inaccessible places or areas where it could function either as a mobile tank or in a concealed stationary position. Among other desirable factors are a high ratio of horsepower to weight for speed and for hill climbing, the provision of more than one driving or propelling unit in case one is disabled or for assistance in steering, under bad conditions, and the economy of using only one drive for ordinary service and all drives only when most severe conditions are encountered, providing that the power train be not unduly complex.

Another desirable factor is the raising or lowering of the body relative to the ground so as to avoid contact between the bottom and obstacles or in crossing streams of water when operating as a mobile unit and for lowering the body in close proximity to the ground when used either as a stationary or mobile fighting unit, so as to obscure its visibility and permit utilization of the protection of relatively low embankments, trenches, shrubbery, boulders, etc.

It is further desirable that a military tank shall have a low center of gravity both longitudinally and laterally and be capable of maintaining these centers as nearly as possible; also that its gun platform be maintained on as near a horizontal plane as possible; even though the terrain be sloping either longitudinally or laterally. To this end the traction units or wheels should be vertically adjustable independently of each other to accomplish this purpose, and should allow full compression or suspension amplitude when such wheel or traction units are in any position relative to the body. The suspension of a tank is the means of support between tracks or road wheels and body; it is the keystone of vehicular efficiency. As the value of any tank is rated by the accuracy of its gun fire, it is obvious that its gun platform must be stabilized or kept as nearly motionless as possible when firing with tank in motion. With the ordinary tank proceeding at a reasonable or satisfactory speed over rough terrain, the various types of suspension used have not provided a satisfactory gun platform or accuracy of fire, nor even a fair degree of driver and gunner comfort. This is partially due to their limited "compression or suspension amplitude" or the limited amount of spring contraction or extension of their suspension and as a consequence, in crossing an obstacle which is higher than the limits of its "amplitude," a sharp movement is transmitted to the gun platform. It is desirable, therefore that a larger suspension amplitude be provided for any tank as a means for absorbing horizontal impact shocks in line of travel, and it is advantageous to provide in the suspension mechanism means whereby both the horizontally and vertically acting forces will be absorbed by splitting the impact in such manner as to lessen its effect upon the suspension mechanism, and consequently the effect of impact upon the gun platform, thus allowing more accuracy of fire and faster speed over irregular ground. It is desirable that the springs of its elastic suspension system after gently absorbing the rise of tracks or wheels in crossing an obstacle shall immediately commence their work of raising the body at a steady, smooth and relatively slow rate so as to maintain their ordinary, natural, relationship. In this way, the body will move forward or backward as nearly as possible in a straight horizontal line, and bouncing or rocking be reduced. It is also important in a tank that means for braking, snubbing and slowing the action of the suspension mechanism be provided to accomplish this effect.

As the surprise attack is an element of warfare, it is obvious that a tank to be effective must eliminate noise. A tank, therefore, which has a practically noiseless suspension and no track to creak or rattle would be of value to an army.

A tank which is especially adapted for use in conjunction with infantry maneuvers must be able to follow infantry operations and therefore its size, particularly its breadth, should be such that it may pass through very narrow spaces such as paths through forests, narrow alleyways in towns, into buildings, caves, etc., across narrow temporary bridges, etc. Its weight should be such that in addition to the above advantages it will not overload a very light or temporary bridge, may cross streams on infantry pontoons, or may be floated across by lashing it to a log or telegraph pole on either side, if its lower portion is water-tight and thus offers a certain amount of helpful buoyancy. It would have further value if its guns were operable during such transit.

It is further important that such a tank should be capable of carrying armament to insure its effectiveness as an artillery unit of reasonably large calibre, to repulse opposing tank attack or to pave the way for an infantry advance, as well as armament for anti-aircraft defense and ordinary machine gun fire: also in case the tank is damaged or capture is imminent, that such weapons can be quickly detached and removed.

It is desirable that the armor of the tank should be of sufficient thickness to stop or lessen the effect of projectiles, bombs, shells or grenades and that, where the design makes it possible, its walls be so disposed and angled that projectiles will glance off or ricochet; or if the armor of the walls be penetrated, that the added thickness of the angle parallel to the axis of the projectile will stop it before it penetrates entirely through the armor.

Part of its armament, and if desirable, part of its armor, should be likewise easily and quickly removable and replaceable so that it can be used independently on the ground separately from the tank, so that the tanks may move forward to an advance position, establish the gun armament in protected "nests" or "strong points" with a reasonable supply of ammunition, protect the operating troops by shielding them with the tank body and fire-power while they are establishing themselves, and speedily return to base still as a complete fighting unit or tank which has simply been stripped of its special purpose weapons and armor, or which may be completely stripped of its armament and return simply as an armored motor vehicle to bring back additional ammunition or reinforcements of men. Or, if desirable, the tank could remain with its established "strong points" and function as a complete tank minus the extra fighting and protective elements.

A feature of outstanding value in any tank would be its ability to deliver high angle fire from any or all its guns, thus allowing it to function also as an anti-aircraft weapon. Since the ordinary anti-aircraft gun is large, static, unwieldy, expensive and requires separate motive power and favorable terrain for placement, it cannot function as a proper accompanying weapon for protection of troops in rough country or even on roads, since it must be stationary and "set up" to fire effectively or at all. Neither the regular artillery nor tanks can deliver anti-aircraft fire fast enough or effectively on account of the limitations of their gun elevations; and in addition, they require separate motive power, are not ready to fire until "set up" and have no armor protection whatever against aircraft. Thus a self-mobile, armor-protected, weapon-vehicle with high elevation of its guns, immediately ready to fire an effective cannon and machine gun discharge against aircraft, would be greatly desirable, whether such tank were accompanying the troops on the road, or in rough country. The comparative cheapness of such small tanks with their effective anti-aircraft fire would solve the latest military problem of defense against mass air troop transport, and the parachuting of troops and material where plane landings are impossible. Therefore, such tanks would be desirable as a defense for isolated or poorly protected railway junctions, factories, bridges or mountain passes, since they would provide a double-purpose defense both on the ground and against air attack and would eliminate large numbers of troops detailed for such defense and a proportion of the expensive long-range anti-aircraft guns.

It would be valuable if such military weapons as smoke or fog producers, flame throwers, and especially trench mortars could be attached to a tank, and it would be further desirable if the tank operators of such weapons had better visibility of the terrain and enemy to make such weapons more effective. A better all-around visibility of at least some of the crew is particularly valuable in offsetting such effective anti-tank methods as "gasolining" or "grenading" a tank, in which the enemy must get very close to a tank. It is also desirable that the bottom of a tank be as free as possible of any bolt-heads, projections, axles, etc., which were liable to catch upon obstructions, wire, etc.

With the accomplishment of the foregoing and other objects in view, all of which will be more apparent as this description proceeds, the invention is exemplified in one form in the novel construction and combination of parts hereinafter described, illustrated in the accompanying drawings, and pointed out in the claims hereto appended, it being understood that various changes in the form, proportion, size and details of construction of the apparatus may be resorted to within the scope of the appended claims without departing from the spirit or sacrificing any of the advantages of the invention.

To more clearly comprehend the invention, reference is directed to the accompanying drawings, wherein.

The body

Figures 8, 9, 10:
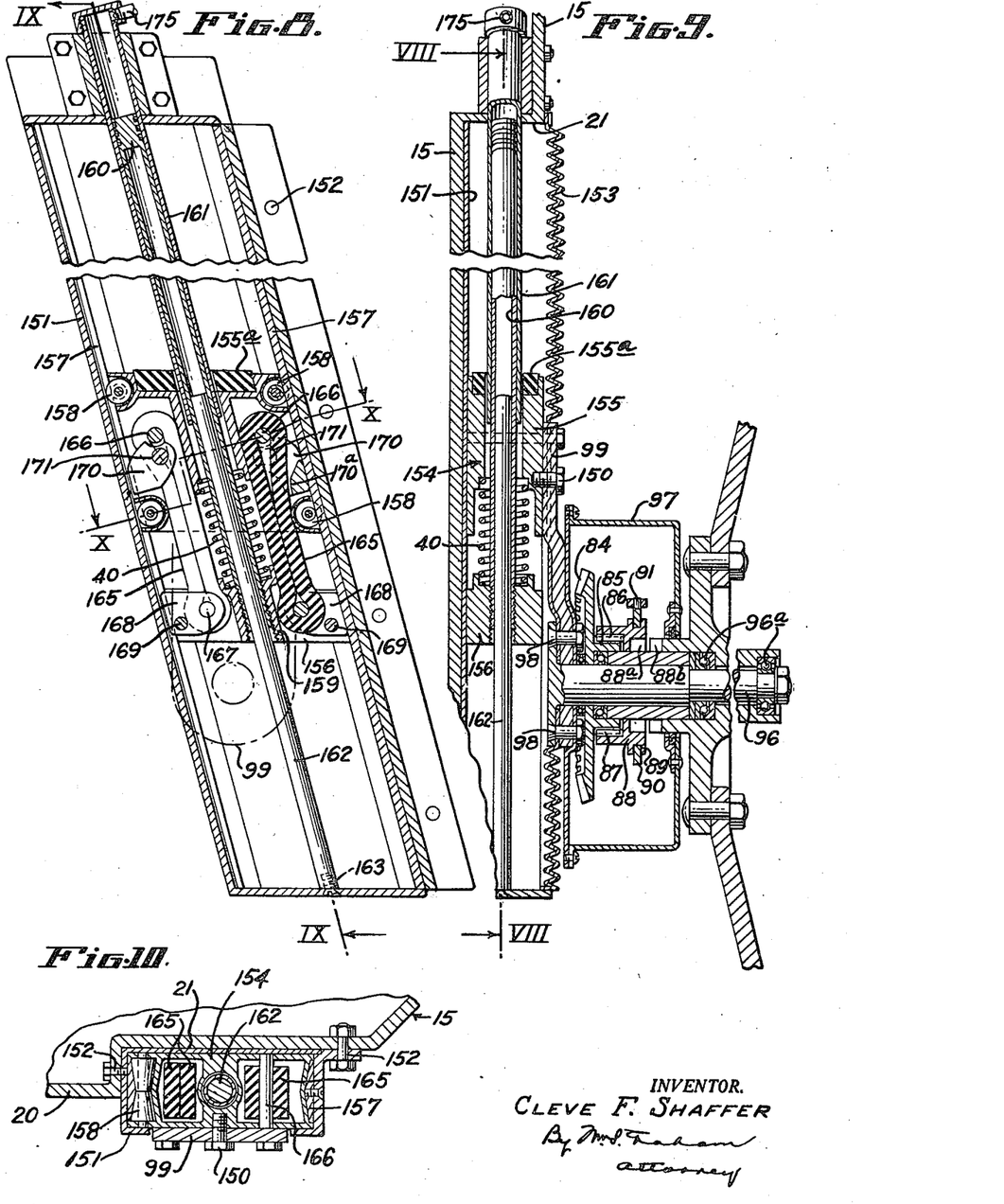
Fig. 8 is an enlarged vertical longitudinally transverse section of suspension mechanism for vertically adjusting the tank body relative to the front wheels, on line VIII—VIII of Fig. 9.
Fig. 9 is a vertical laterally transverse section of suspension mechanism shown in Fig. 8, on line IX—IX of Fig. 8.
Fig. 10 is a horizontal section on line X—X of Fig. 8.
Figure 13:
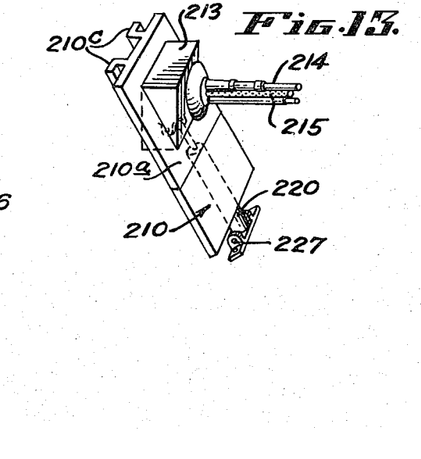
Fig. 13 is a perspective of gun mount plate.

Referring to the drawings in which like characters of reference indicate corresponding parts in the several views, 15 indicates generally a preferred form of tank body of suitable armor material, in which the front wall 16 is inclined upwardly and rearwardly from bottom to top at an angle to the vertical and has a portion cut out of its upper central area providing opposing side edges 17 and a front breast plate 18 which has slots 19 on either side thereof for receiving grooved tracks of a gun mount to be further described. The side walls 20 of body 15 are each provided at the front end with a vertical recess 21 for receiving the vertical adjustment suspension mechanism shown in Figs. 8 and 9. The side walls also have a horizontal recess 22 at their lower horizontal portion to allow space for operative mechanism hereafter described. These foregoing walls, together with a rear wall 23, provide an operator's compartment. To the rear of the operator's compartment is a motor compartment generally indicated 24 which preferably is wider than the operator's compartment, but narrower than the extreme of width of the wheels of the tank. The additional width of the motor compartment provides a narrow horizontal elongated platform 25 on each side of the motor compartment 24 and to the rear and side of the operator's compartment. This illustrated and described preferred form of body lends itself to casting of the body in integral form to facilitate mass production. It is preferred that the forward walls of the tank body be of thicker metal than the side or rear walls, it being suggested that 1½ inch metal be used in the forward walls, and ¾ inch metal in the floor, side and rear walls. It is to be understood that both the engine compartment and the operator's compartment are water-tight to about the middle of their vertical dimension and have suitable steel bottom to support the motor unit in the motor compartment and the necessary mechanism in the operator's compartment, and that suitable drain plugs may be installed in the bottom of the tank. The walls of the motor compartment 24 may be extended upwardly by separate side wall plates 20ª and by a rear wall 23ª, suitably relatively connected and braced as by angle braces 20ᵇ.

Foldable steering post

In the operator's compartment there is a driver's seat 26 and steering mechanism comprising a steering wheel 27 which operates through beveled gears 28 to rotate a vertical steering post 29 and the sprocket 30. Adjacent its base, the shaft 29 has a pivot joint 31 by which the steering wheel and post may be tilted forward so as to be out of the way of the operator when more space is needed in the compartment for operation of a forwardly disposed armament. The steering post 29 is suitably supported in a base support member 32.

Running gear

It is preferred that the vehicle have two wheels 33, 34 at its forward end and a single wheel 35 at its rearward end.

Driving mechanism of rear wheel

Normally the driving power is through the rear wheel 35. The wheels themselves are of a well-known type, each having tire 36, felly, and disc 36ᵇ, hub 36ᶜ and usual truck type hydraulic brake 36ᵈ connected and operated by usual mechanism (not shown). It is preferred, however, that the tires have a tough rubber outer casing filled with a resilient composition material so as to be puncture proof while still retaining a degree of resiliency. The rear wheel is mounted fixedly on a stub axle 41, the latter being rotated by shaft 42 through a universal joint 43, the shaft 42 being driven by bevel gears 43ᵇ rotatively actuated by shaft 44, said shaft having a universal joint 45 intermediate its ends. The shaft 44 is rotatively driven by any suitable type of motor unit 46 through transmission 47 and clutch 48. The transmission lever 49 extends into convenient relationship to the operator's seat 26 and is operated therefrom. The clutch 48 is any suitable type operated by usual foot pedal and rods (not shown), and suitable transmission emergency brake 52 is operated by hand lever 53 through the transmission brake rod 54. A proper housing 55 is provided for the drive shaft 44, the housing being provided with a pivotal joint 56 to allow for vertical adjustment and suspension of the rear wheel, to be further described. In the event of disablement of the normal rear drive, the motor assembly may be disconnected therefrom and transferred to a drive mechanism for the front wheels. For this purpose, intermediate the ends of drive shaft 44 there is a dog clutch 44ª the jaws of which are normally intermeshed, but may be thrown out of engagement by pivotally mounted bell crank 44ᵇ by lever 44ᶜ. The drive may then be transferred exclusively to the front wheels in the manner next described.

Driving mechanism of front wheels

At times, especially in soft ground or at any other time when traction is not good, or even if the driving mechanism to the rear wheel should become disabled, driving power may be imparted to either of the front wheels 33, 34, singly or to both of them simultaneously independently of the drive of the rear wheel or simultaneously therewith if desired. This drive through the front wheels is accomplished by the same power source 46, transmission 47, and clutch 48. The transmission 47 continuously rotates one jaw 60 of a dog clutch simultaneously with rotation of the shaft 44. The other jaw 61 of the dog clutch is operatively intermeshed with the jaw 60 by any suitable means such as bell-crank lever 63 which is pivotally mounted at 64, which is operated by a rod 62 extending into the driver's compartment. When the jaws 60, 61 of the dog clutch are engaged, they rotate a stub shaft 65 which rotates a gear 66 mounted thereon. The gear 66 meshes with a gear 67 which is keyed to a shaft 68 joined in bearing 69. The shafts 65 and 68 each mount a sprocket 70, 71 which, respectively, drive chains or belts 72, 73. At the opposite end of the respective chain drives 72, 73, each chain drives a sprocket 74, 75, each of which is keyed to a separate drive shaft 76, 77, and each of these respective drive shafts 76, 77, furnish motive power to one of the front wheels when either one or both of the front wheels are selectively connected in the drive train. It will be noted when the dog clutch 60, 61 is intermeshed, the rotation of front-wheel drive shafts 76, 77 and their attendant mechanisms is simultaneous up to the mechanism which is immediately adjacent to the front wheels, but driving power is not imparted thereby to the front wheels except through a clutch which will be further described. Since the mechanism for furnishing driving power to the front wheels either independently or simultaneously is descriptively the same with relation to each front wheel, a description of one of such mechanism is sufficient. As heretofore stated the sprocket 75 is rotated by the chain 73 and rotatively drives a shaft 77. The shaft 77 is divided into forward and rearward parts 77$^a$ and 77$^b$ which are joined together with a longitudinally slidable key spline 78. Each of the parts 77$^a$ and 77$^b$ are provided with suitable bearings 81, 82, and each part has a universal joint 79, 80. At the front-wheel end the forward drive shaft 77$^b$ is provided with a beveled pinion 83 which meshes with a beveled gear 84, the latter having a collar 85 provided with slotted splines 86 into which slidably engage the teeth 87 of a drum 88 which has an annular groove 89 therearound and in which is slidably mounted a ring 90. This ring 90 is adapted, by means of a pin 91, to be engaged by the yoke of a bell-crank type of lever 92, the other end of which 93 is connected to a Bowden wire control 94, flexibly connected so as to allow the wheel to move up and down, the wire extending into the operator's compartment and being operatively connected to a ratchet lever and rack assembly 94$^a$ through which the operator may manipulate the lever 92 to reciprocate the spline teeth 87 in the spline grooves 86. The outer face of the drum is provided with one jaw 88$^a$ of a dog clutch which is adapted to intermesh with the teeth of another jaw 88$^b$, the latter being the inner portion of the hub of the wheel. By this means of operation, it will be noted that when the lever 92 is operated through the Bowden wire control 94 so that the jaws 88$^a$, 88$^b$ of the dog clutch are engaged, the wheel has driving power transmitted to it, and that no driving power is transmitted to that wheel when the jaws 88$^a$, 88$^b$ are disengaged. In other words, when the jaw clutches 61, 62 and 88$^a$, 88$^b$ are disengaged the entire power or transmission train between them is idle and consuming no power or fuel, nor wearing, thus providing a great economy and insurance from breakdown. Normally the clutch of the front wheels will be maintained out of engagement by the spring 95. It will be noted (see Fig. 9) that front wheels 33, 34 rotate freely and independently on spindle or stub axles 96 and antifriction bearings 96$^a$, when not connected to the driving mechanism. The driving mechanism adjacent the front wheels is enclosed in a protective housing 97 and the entire front wheel assembly is mounted by bolts 98 upon a wheel supporting bracket 99 which is vertically adjustable by mechanism hereafter described. It is understood that the openings from the motor compartment for and around the three driving shafts are fitted with ordinary type of water-tight sealing means.

Steering mechanism

As heretofore stated, the operator's compartment is provided with steering wheel 27 and its above-mentioned attendant mechanism, including at its lower end a sprocket gear 30. Around sprocket gear 30 is a chain 101 which passes under the seat 26 and the chain guard 26$^a$ for driving a similar sprocket 30$^a$ mounted on an auxiliary steering shaft 30$^b$ which is vertically supported by brackets 30$^c$ to the rear of wall 23, said shaft extending upwardly to the top of the tank body and being manually operable from said top, as further explained. Mounted on said shaft 30$^b$ immediately above sprocket 30$^a$ is an exactly similar sprocket gear 30$^d$ which drives a chain 101$^a$ which has each of its opposite ends respectively connected to cables 102, 102$^a$ which pass through a suitable conduit 103 and respectively connect with the opposite ends of a chain drive 104. The main steering gear and auxiliary steering gear meet the desirable purpose that the operator-driver may be relieved of steering duties when firing cannon with the tank in motion, or in case of an incapacitating injury to the operator-driver, and it becomes essential that the tank be immediately guided to a safe place, in which case the auxiliary or emergency means of steering may be operated by either of the persons who are sitting in the pannier seats. Such auxiliary steering may be by any suitable means for rotating shaft 30$^b$, such as a lever of socket type 30$^e$ to engage the square head of shaft 30$^b$ or by a separate steering wheel having similar socket. Such a lever or steering wheel may be permanently carried on shaft 30$^b$ or carried separately by the tank at any readily accessible place. The chain 104 passes around the sprocket gear 105 which rotates a worm shaft 106 for the purpose of rotating a worm gear 107 keyed on shaft 108 and thereby, through lever 109 and radius rod 110, actuates the steering arm 111 which is fixedly connected to a housing 112 having a bearing 112$^a$ within which the axle 41 of the rear wheel rotates. The housing 112 has a ball joint engagement with a housing 113 arranged so that the wheel may pivot on the kingpin 43$^a$. The housing 113 also serves as a casing for the driving mechanism adjacent the rear wheel.

In case the steering mechanism to the rear wheel should become disabled, the operator, during such emergency conditions, or under any other conditions which make it desirable, may steer the tank by alternately operating the front wheel drives by the manipulation of clutch 81 or in conjunction with the rear drive can put power on one front wheel to make a turn of smaller radius.

Rear wheel suspension and vertical adjustment mechanism

Figure 7:
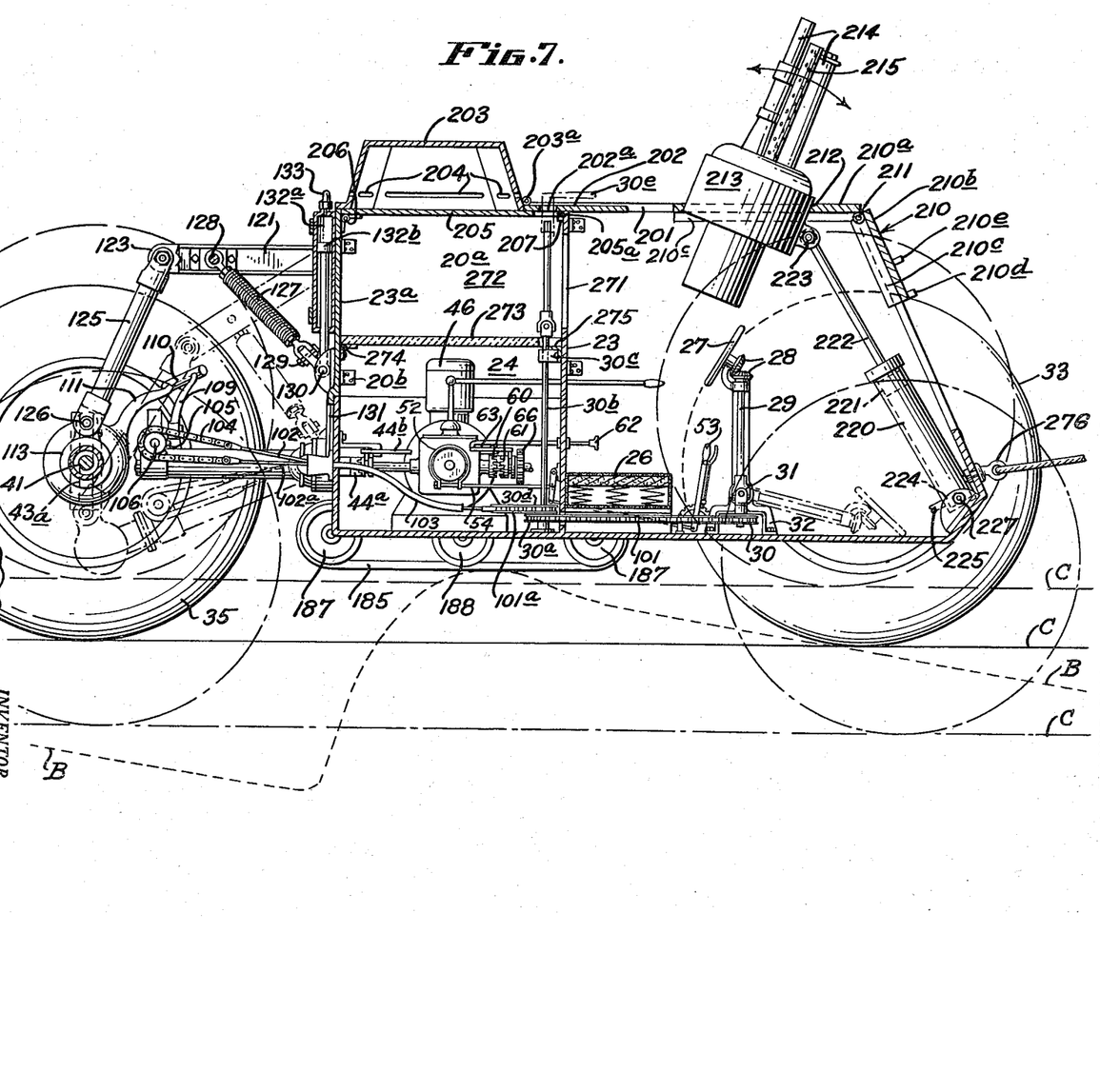
Fig. 7 is a longitudinal side view, the tank body being in section, to show interior mechanism.

At the rear, the body of the tank has spring suspension relative to the rear wheel by means of a resilient frame mounted on rear wall 23ª and indicated generally 120, comprising converging arms 121 which extend horizontally to the rear of the tank body from pivoted connections thereof 122. At their opposite ends, the arms 121 jointly carry a bearing 123 which supports a shaft 124 rotatably mounted therein. The shaft 124 pivotally supports a hanger rod 125 which, at its opposite end has a bolted pivotal connection 126 with the housing 113. The rear body suspension 120 is provided with resiliency by means of spring members 127 which are connected at one end to a cross bar 128 athwart the outer portion of the converging arms 121, and having their opposite ends connected as at 129 to a cross bar 130, the latter being vertically reciprocable in tracks 131 by suitable means such as cylinder 132ª and piston 132ᵇ which may be either hydraulic or pneumatic and which may be controlled from the operator's compartment through a conduit 133 leading to a suitable pump 134ª and distributor chamber 134 and controlled by valve 135. It will be observed that at all times the frame assembly 120 is provided with resilient suspension due to springs 127 and that upon operation of the piston 132ᵇ in a downwardly direction, the cross bar 130 likewise moves downwardly and lowers the frame 120 by moving the arms 121 downwardly. This likewise adjusts the hanger rod 125 downwardly. It will be noted that the pivot 56 in the housing for drive shaft permits the drive and steering mechanism to likewise move downwardly. As a matter of fact, this mechanism of the rear wheel does not move downwardly except with relation to the previous horizontal level of the tank body. The practical effect of the so-called raising and lowering of the rear wheel is to raise and lower the rear end of the tank body relative to the ground. These various positions and adjustments of the rear wheel mechanism are best shown in Fig. 7. It will be noted that this suspension offers large movements upwardly and downwardly of the wheel relative to the body to absorb shocks when in motion and when the wheel is in the lowest position relative to the body, a very large amplitude of the springs will be noted. The cross bar 128 is mounted at both ends in rubber blocks for additional shock absorption, and can be moved horizontally in slots 128ª to adjust spring tension. Any suitable type of snubbers or rebound mechanisms of ordinary automobile or truck type can be employed to absorb rebound and stabilize the body.

Front wheel suspension and vertical adjustment mechanism

As previously stated, the front wheel and the driving mechanism therefor is mounted on a hanger bracket 99. This hanger bracket 99 is secured, as by bolts 150, to a vertically movable wheel suspension mechanism for the front wheels. This front wheel suspension mechanism is mounted in the casing 151 which fits into the recess 21 of the tank body 15, thereby being positioned with its longitudinal axis angularly disposed to the perpendicular and being tilted rearwardly from bottom to top, thus absorbing thrust both vertically and horizontally for better stabilization of the tank body when moving over uneven ground. It will be understood that the front wheel suspension mechanism is similar in respect of each of the front wheels. The casing may be in two parts as shown, or one piece and is bolted to the body 15 through holes 152. The outer face of the casing which is adjacent and parallel to the vertical plane of the wheel comprises an expandible and contractible bellows 153. This bellows is divided into two sections, one above and one below the hanger bracket 99, the adjacent ends of the bellows being connected to the hanger bracket and the extreme opposite ends being connected to the opposite ends of the casing 151, thereby providing for a flexible and extendible outer side wall to said casing with the hanger bracket 99 intermediate its ends, thereby closing that face of the casing against entry of dirt, dust, etc. A vertically movable wheel suspension mechanism, generally indicated 154, is slidably positioned within the casing. This slidable suspension mechanism is divided into an upper portion termed a carrier 155 and a substantially stationary, though adjustable, lower member termed a block 156. The carrier 155 rides on tracks 157 which are longitudinally disposed along the inner side of the front and rear walls of the casing 151 having anti-friction rollers 158 for that purpose. The lower member or block 156 is connected fixedly as at 159 to the free end of an elongated hollow piston 160 operated by hydraulic action which slidably operates in a cylinder 161, the cylinder and piston being longitudinal of the casing and passing through circular openings in carrier 155 and block 156 and being stabilized and guided at the lower portion by an inner guide tube or rod 162 secured to the bottom wall of the casing as at 163 and extending upwardly into the elongated hollow piston. The block 156 is placed and held in position selected by the compression of hydraulic fluid against the piston which, in turn, through the suspension mechanism, supports the weight of the tank. Circumferentially of the piston, and between the spaced carrier 155 and block 156, a compression coil spring 40 is provided to resiliently absorb the downward rebound thrust of the weight of the tank body. The upward thrust of the wheels relative to the tank body is resiliently absorbed in resilient members which may be any suitable spring means, and as here exemplified comprise heavy rubber loop members 165. These resilient members 165 are mounted at their opposite ends around bolt members 166, 167 in the respective carrier and block. In the carrier 155 bolts 166 may extend through the body thereof whereas in the block 156 the bolts 167 are mounted in one end portion of a cam 168 which in turn is pivotally mounted as at 169 to the block so that the cam faces are increasingly pressed against track 157 as the rubber loop springs 165 are increasingly tensioned, the cam 168 thereby providing an additional means of holding a selected position or braking means for the block 156 under driving shock. These cams do not, however, prevent the upward and downward adjustment of the block 156 in the course of its adjustment by the piston 160. The upward movement of the carrier member 155 is also provided with a snubbing or braking means consisting of the cams 170 which are pivotally mounted on the carrier by pins 171. On upward movement the faces of these cams are pressed against the tracks 157 by the tautening of the looped rubber spring members, which press increasingly, when increasingly tensioned against a shoulder 170ᵃ on the cam. On the rebound downward movement of the carrier these cams because of their shape have an additional wedge action against the tracks to slow the recoil of the carrier. It will be noted that the block and carrier are in spaced relation, ordinarily separated by the weight of the tank on the rubber loops or springs 165 and the bumper spring 40, but are flexibly connected by the resilient springs 165. Therefore, the carrier and block are movable in unison for adjustment by movement of the piston 160. The piston 160 is actuated in any suitable manner, such as hydraulic pressure, through conduit 175 which communicates with the upper end of cylinder 161, and extends to the pressure source 134 where it is regulated by the tank operator through valve 176. It will thus be obvious that since each front wheel is mounted on a hanger bracket 99 which in turn is secured to the carrier member, the operating shocks and vibration of the wheel and rebound, respectively, will be absorbed in the rubber springs 165, rebound spring 40, and cam snubbers 170. In the event of excessive operating shock, the resilient oval bumper 155ᵃ will contact the top horizontal wall of recess 21.

Figure 3:
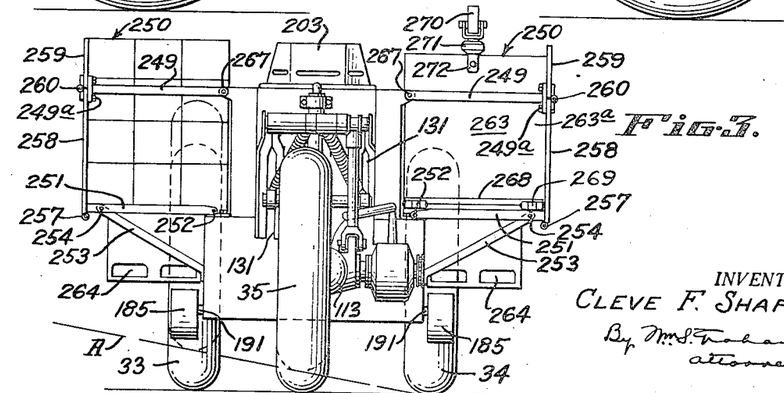
Fig. 3 is a rear elevation of the tank apparatus.

It will be noted also that each of the entire front wheel mechanisms, including its driving means, may be independently or simultaneously raised or lowered relative to the tank body. This makes it possible to operate the vehicle over sharply sloping or inclined ground and yet maintain the plane of the tank body substantially horizontal as indicated by dotted lines in Fig. 3, in which one front wheel and rear wheel are shown by dotted lines in partially elevated positions, and the sloping ground level is indicated A.

The effect of various adjustments of the wheels to provide different ground clearances for the tank body are shown by the ground lines C in Fig. 7.

Trench crossing unit

As a further and an additional means to provide mobility over the most severe conditions of terrain, an optional and detachable mechanism is provided for crossing holes, trenches, and the like, where the traction wheel is too small in diameter to span the hole. One of such units is on each side of the tank body. Adjacent the base of the body 15, preferably at the rearward portion thereof, and intermediate the rear and front wheels there is provided a trench crossing unit, indicated generally 185. It comprises endless belt 186 of any suitable type such as metallic sections or plates, a continuous belt of composition material, canvas, metallic webbing, etc., of which there are many well-known types. The belt is mounted to move automatically by friction when contacting the ground or obstructions, no power being necessary. The belt is mounted to revolve on relatively spaced split end rollers 187 and a central split roller 188. The shafts 189 of the two end rollers 187 have journaled mounting in arcuate supporting arms 190, which in turn are mounted near the other end on studs 191 which extend outwardly from the body 15. On the shorter end of these supporting arms 190 a downward extension supports, through an elongated hole therein, a suitable rod upon which a rubber spring or buffer 90ᵃ is carried, the other end of the rod extending through a similar downward extension of a similar arm. At the other end of this arm, however, a slotted opening 188ᵃ engages an axle 188ᵇ which supports the two split half sections of the flanged central roller 188. A corresponding arm from the other end roller also engages and supports the axle of the split central roller in the same manner. The action of this mechanism is thus: when any part of the belt presses against the ground or strikes an obstacle, it raises one or more of its rollers, which in turn moves the supporting arm or arms with the result that the rubber spring is compressed between the two downward extensions of the arms and thus absorbs the shock of contact. The purpose of this unit is to support the central portion of the tank body in crossing cavities in the ground, such as a trench indicated by dotted lines B—B in Fig. 7. When the front wheels are unsupported over the void of a hole or trench, the tank body is supported on one bank by the crossing unit 185 and rear wheel which furnishes driving power. When the front wheels have reached the other side of the trench and again have traction on the ground, the tank is supported on the endless belt element and the front wheels while the rear wheel overhangs the void of the trench, in which case driving power may be applied to the front wheels to pull the tank forward completely across the depression or trench.

These trench crossing elements, which are positioned similarly on each side of the body, are, even though the ground pressure per square inch of this tank is exceptionally low, also of decided value in very soft ground. The belt serves as an additional means of crossing bad terrain and prevents the tank from sinking into the soft ground. It can be completely and quickly detached by removing the nuts on studs 191 and the tank still retains its superior mobility.

Top arrangement

Provision is made for protective armor plate comprised of sections on top of the tank. Firstly, there are strips of armor plate 200 longitudinally of each side portion of the top of the tank body. At the inner opposing edges of side strip portions 200 there are tracks 201. On these tracks 201 there is slidably mounted a top plate 202 on which is mounted to slide therewith a pyramidal frustum turret 203 which may assume any suitable shape and may have the usual ventilation flaps and eye slits. As here illustrated, it comprises an octagonal tapered side wall provided with sight openings 204. Normally, plate 202 and turret 203 are forwardly of the tank body and provide for additional head-room for the operator, especially when he is operating the main gun battery in a directly forward position. If desired, plate 202 can be fastened or locked by suitable means to body 15 either forwardly or rearwardly. The rearward compartment of the tank body is closed at its top by a door or cover 205 which is hingedly mounted as at 206 on rear wall 23ᵃ, and just below the plane of the tracks 201, so as not to interfere with the rearward sliding of the top plate 202 on the tracks 201. The free end of the door or cover 205 rests on a stop 207 and has a cut-out 205ᵃ through which the auxiliary steering post may extend, the top plate 202 being provided with a hole 202ᵃ which, when the plate 202 is slid rearwardly, overlies said cut-out 205ᵃ for access to the auxiliary steering post. By sliding turret 203 and plate 202 rearwardly over tracks 201 the tank operator is provided an opening for ingress and exit. An additional emergency means of exit is provided in case of damage to tracks by the hinging of the turret 203 on plate 202 as at 203ª.

*The main gun mount*

Figures 4, 11, 12, 14, 15, 16:
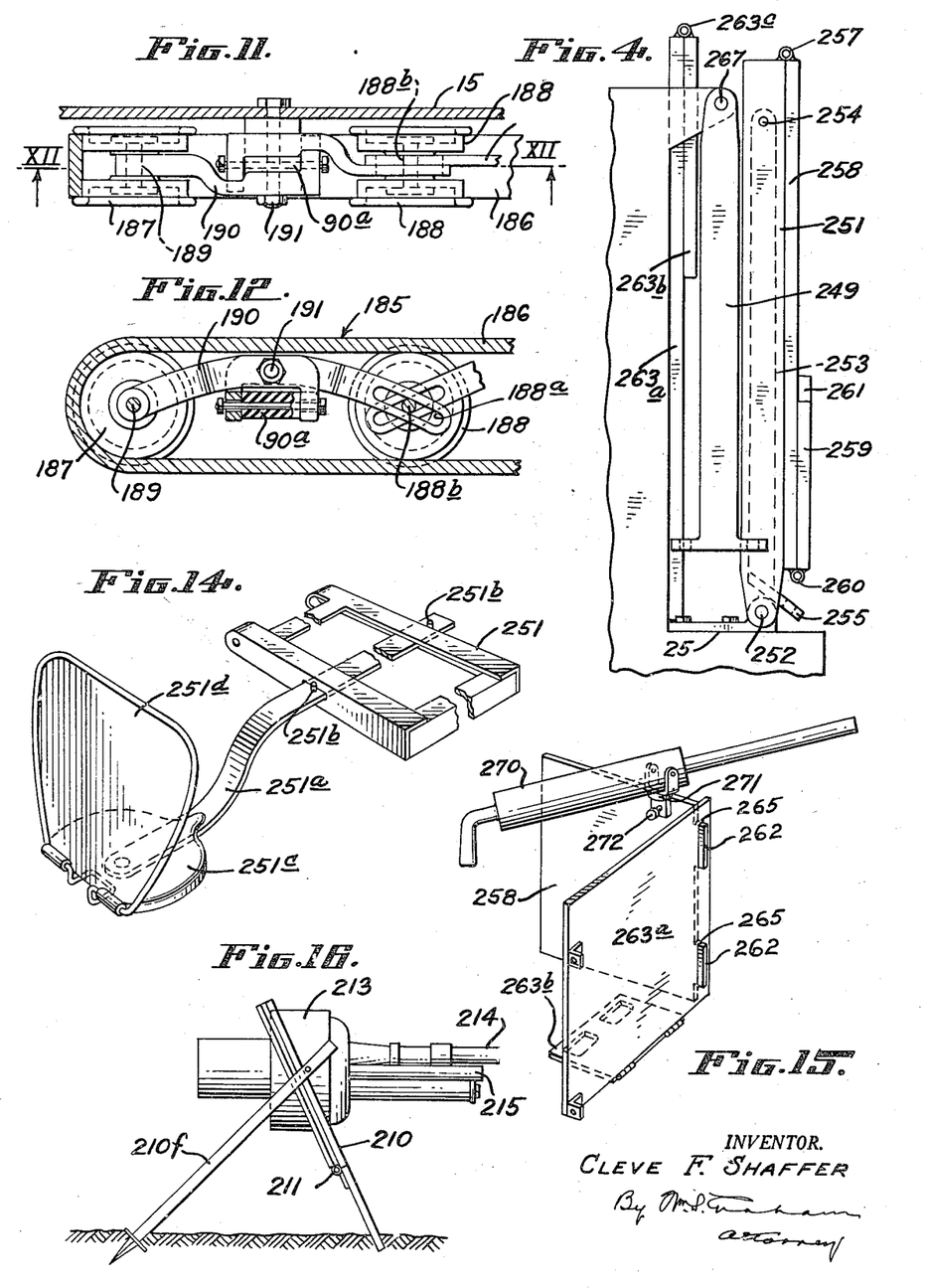
Fig. 4 is an enlargement of portions of structure shown in Fig. 3, in folded position.
Fig. 11 is a fragmentary enlarged plan view of tractor mechanism.
Fig. 12 is a fragmentary section on line XII—XII of Fig. 11.
Fig. 14 is a perspective of modification of seat arrangement.
Fig. 15 is a perspective of pannier plates employed as a protective unit separate from tank body.
Fig. 16 is a side elevation of gun mount plate employed as a protective unit separate from the tank.
Figure 5:
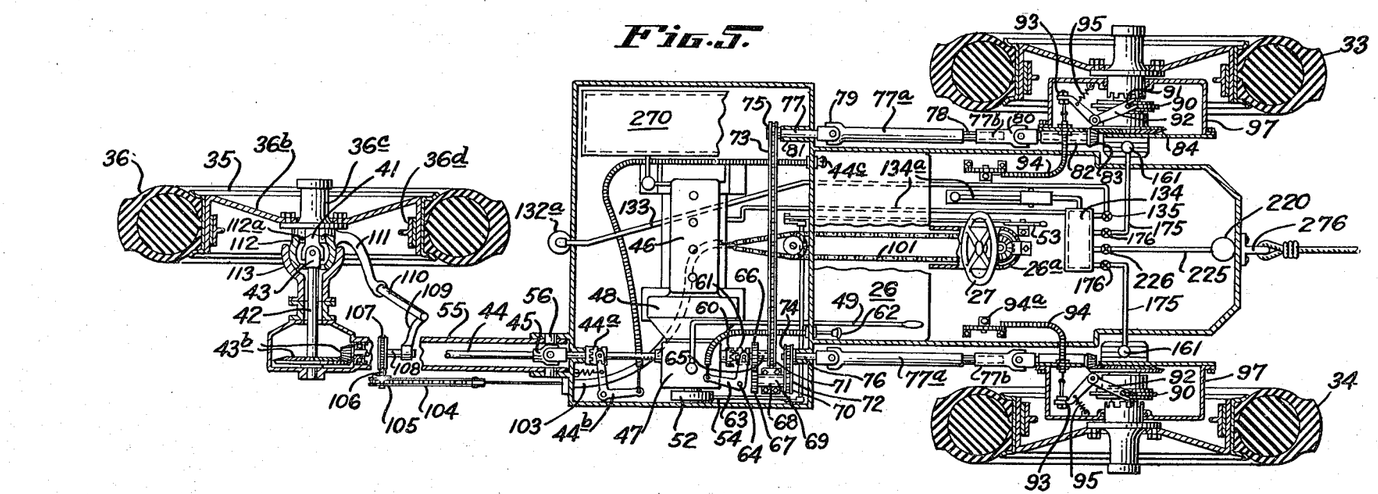
Fig. 5 is a longitudinal horizontal plan view of mechanism within tank body, the lower portion of walls being shown in section.
Figure 6:
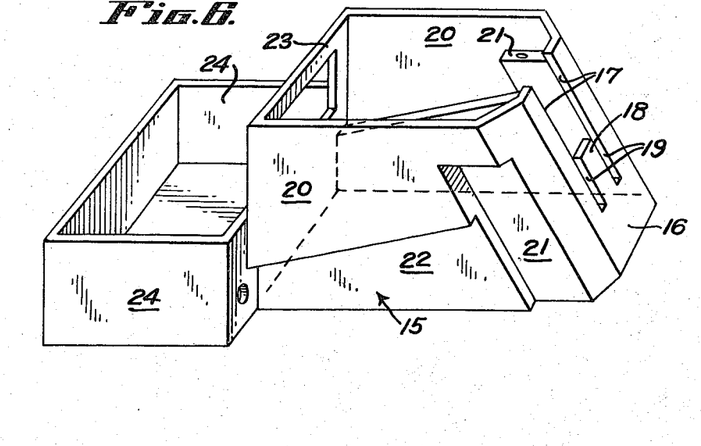
Fig. 6 is a perspective illustrating a preferred type of tank body.

As previously stated the forward wall 16 of the body 15 is provided with a central opening 17 which is partially closed by a breast plate 18 having slots 19 on each side of the breast plate. The vertically inclined side edges of opening 17, and including slots 19, provide vertically inclined tracks slidably to receive a front armor plate 210, said armor plate being divided into two sections, 210ª and 210ᵇ hingedly connected by hinge 211. The upper part or section 210ª has an opening 212 therethrough in which is mounted a main gun support 213 which is of universal joint or trunnion structure and contains a battery of guns which may include any suitable and desired type of one or more calibres. As exemplified herein these guns consist of one rather large calibre gun or cannon and recoil chamber 214 and a smaller calibre gun 215, which preferably may be a machine gun. The invention is not limited to particular types or character of the guns since that is a matter for determination by military experts dependent on the character of use to which the tank is to be put, since varying uses dictate different types of guns; it being one of the advantages, however, of this tank that by mere change of position of support 213, the fighting character of the tank may be instantly changed. As for instance, with guns 214, and 215 in relatively horizontal position, the tank is suitable for general tank and anti-tank firing, while if gun mount 213 is raised, the guns are immediately suitable for delivery of anti-aircraft fire. Under normal running or operating conditions, the armor plate 210 overlies the forward wall 16 of the body and provides additional armor thickness at the front which naturally will receive most hits, in which case the grooves 210ᶜ of the armor plate 210 are supported by the tracks on the vertical side edges of the opening 17 and including slot 19. In such position the breast plate 18 underlies the lower portion 210ᵇ of armor plate 210. However, as shown in Fig. 7 when guns are needed for anti-aircraft fire, the armor plate 210 is adaptable for sliding upward in its tracks and may be swung centrally on its hinge 211 so that the lower portion 210ᵇ serves as a holder or support in the guides and fills and protects the open upper portion 17 of the front wall, while the section 210ª hinges backwardly and is supported by the tracks 201 in the top plates 200 which take the recoil of the gun, the plate 202 and periscopic turret 203 having been moved rearwardly on the tracks 201. When the armor plate 210 is thus elevated, the breast plate 18 effectively protects the operator and the internal mechanism of the tank. In this elevated position, the gun battery may be operated in a vertically directed range of fire. The operator first having tilted the steering post 29 to its forwardly position, slides his resilient rubber seat pad downward and forward and assumes a suitable semi-reclining operative position with knees drawn up. Since the main gun support 213, guns 214 and 215, and the plate 210 would undoubtedly be of considerable weight, means are provided for mechanically raising and lowering the plate 210 and the support 213. This means comprises a compression cylinder 220 having a piston 221 therein to which is connected, through the head of the cylinder, a piston rod 222, the piston rod being pivotally connected at 223 to the main gun mount or support 213. The piston 221 is moved upwardly and downwardly in the cylinder 220 by pneumatic or hydraulic force through an opening 224 to which is connected conduit 225 which in turn communicates with the power source 134 and is controlled by the operator at valve 226. Since there will be a forward and rearward movement, as well as a vertical movement of the support 213, in raising and lowering it to its several positions, the cylinder 220 is pivotally mounted at its base as at 227. In order to prevent holder plate 210ᵇ from being pushed entirely out of its anchoring rails 210ᶜ by error or otherwise in the operation of cylinder 220, suitable stops 210ᵈ on plate 210ᵇ and 210ᵉ on the front of the body, will come into contact before the limit of lift is reached. These stops can be disengaged when it is desired to remove assembly 210 and 213 from the tank as the latter advantage would be of great value in case the tank was damaged, and it was desirable to remove the guns to escape capture or to use separately from the tank as an armored "strong point." As shown in Fig. 16, the plate 210 and gun support may be set up as an independent fighting unit by means of a supporting strut 210ᶠ which may be carried by the tank.

*The side panniers*

On each side of the tank body adjacent the rear end, that is, rearwardly of the front wheels, there is provided a removable combination unit which, for lack of better description, may be called panniers for the transportation of men, supplies, and ammunition in partially armor-protected safety and other followingly described purposes, generally indicated 250. These panniers each comprise a substantially rectangular supporting base frame 251, which frame structure may be angle iron. The base frame is supported at its inner longitudinal edge on the platform 25 to which it is hingedly connected as by hinges 252, the pintle of the hinge being spaced from the tank body for purposes to be described. The base frame is supported at its outer longitudinal edge by a truss or brace 253 which has hinged connection to the outer side thereof as at 254, the brace having at its opposite end a bent portion 255 which fits over a stud 256 extending outwardly from the tank body, and to which it may be tightened by the usual nut for a releasably fixed fastening. At the outer edge of the frame 251 there is hingedly connected as at 257 a vertically upright armor plate side wall 258 which, at its upper edge, has an upward vertical extension plate 259 hingedly connected thereto by pintle hinges 260, and having upper edge lugs 261. Section 258 of the side wall also is provided with front edge lugs 262. At the rear, the side wall 258 is braced by truss arms 249 which have pivotal connection to the body on the rear side of extended ear 267 and are bolted at the opposite end to both sections 258, 259 of the side wall to furnish rigidity, stability, and strength to the side wall as well as a back for the seat.

An inclined front armor plate 263 is provided for each pannier consisting of an upper section 263ª and a lower section 263ᵇ relatively hinged as at 263ᶜ at approximately the level of the base frame 251, the lower section 263ᵇ being lockable in position to prevent swinging, and preferably being narrower than the upper section. The lower section 263ᵇ has adjacent its lower edge elongated holes or stirrups 264 as a foot rest for the person riding on seat 268 in the pannier. The section 263ᵃ of the front plate has sufficient width to overlie the outer front edge of side plate 258 and is provided with slotted holes 265 adjacent the outer vertical edge to receive the lugs 262 of the upper and lower side plates 258, 259, in order to provide an interlocked and secured joining angle. At its opposite or inner vertical edge, the front plate has suitable flanges or lugs to secure it to the tank body by bolts 266. From the above description it will be observed that the angle iron base frame 251 may be hingedly swung upwardly in spaced parallelism to the tank side, forwardly of the ear 267 (see Fig. 4), and that the spacing from the tank body of the pintle of hinges 252 allows a space between the upfolded base frame and tank body. This will also raise the supporting brace 253 which will nest within the angle iron of the up-swung base frame 251. The side section 258 may then be reverted downwardly on hinges 257 and the upper side section 259 may be then reverted upwardly on hinges 260, as in Fig. 4. The rear brace or truss 249 may be swung downwardly to the rear of ear 267. In the space between the tank body and these last mentioned parts (as provided by spacing the pintle hinge 252 from the tank body), there may be carried the front wall sections 263ᵃ, and 263ᵇ in folded arrangement. Thus the panniers may be folded and carried by the tank within the maximum tank width so as not to interfere with passage through narrow spaces.

When the panniers are in their erected or operating position on the side of the tank body, the rectangular portion of base frame 251 is overlaid by the seat 268, the latter preferably being in two relatively overlying parts hinged rearwardly at 269. The upper edge of the forward wall 263 may be used as a gun mount for a machine gun 270 which may be releasably mounted thereon in any suitable manner as by a swivel 271 and a clamp 272. Thus, each pannier may be an armor-protected fighting unit of the tank itself. It will be further observed that the lower front wall section 263ᵇ may be folded rearwardly and upwardly as shown by dotted lines in Fig. 2 and suitably locked in position so that it is in substantially the same plane as the bottom edge of side wall 258 and frame 251, thus providing a relatively large armor-enclosed and protected space suitable for transporting ammunition or supplies in comparative security through heavy enemy fire. By pulling the pintles of hinges 257, bolts 249ᵃ and bolts 266, the front wall and the side wall of the pannier may be removed from the tank and set up on the ground as a protected machine gun nest while the tank itself may return to base headquarters for additional men or supplies, or the tank, still a complete fighting and armored unit, may move to an adjacent favorable fighting position or anywhere desirable (see Fig. 15). It will also be observed (see left hand portion of Fig. 3), that these panniers may be employed for carrying boxes of ammunition or supplies. Manifestly, they could also be employed for transportation of men. A compensating benefit for the lack of total armor protection to the pannier personnel (who are protected by armor on front and both sides), is that they have a far superior, all-direction visibility, not possessed by any of the personnel of an ordinary tank; they thus can improve the operation and efficiency of their tank, and besides can escape from such dangers as "gasolining" and "grenading," etc., which are mainly caused by lack of visibility.

Figure 1:
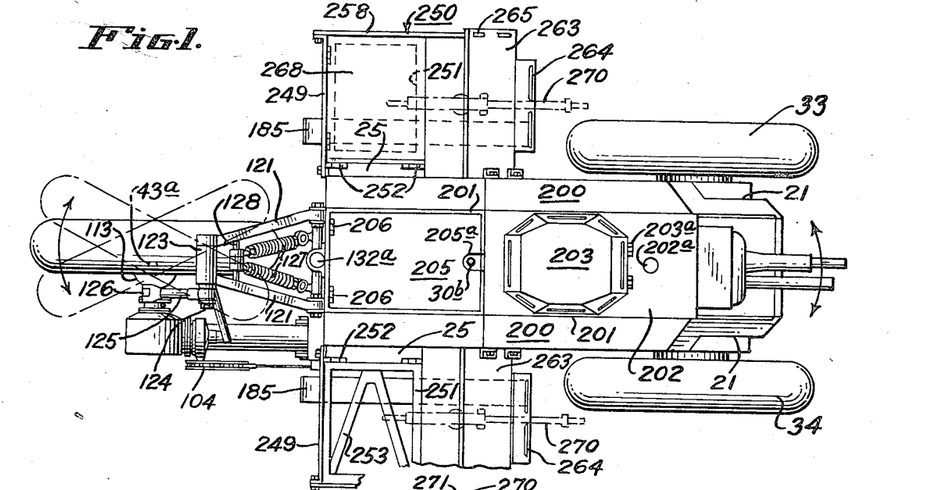
Fig. 1 is a plan view of tank structure.
Figure 2:
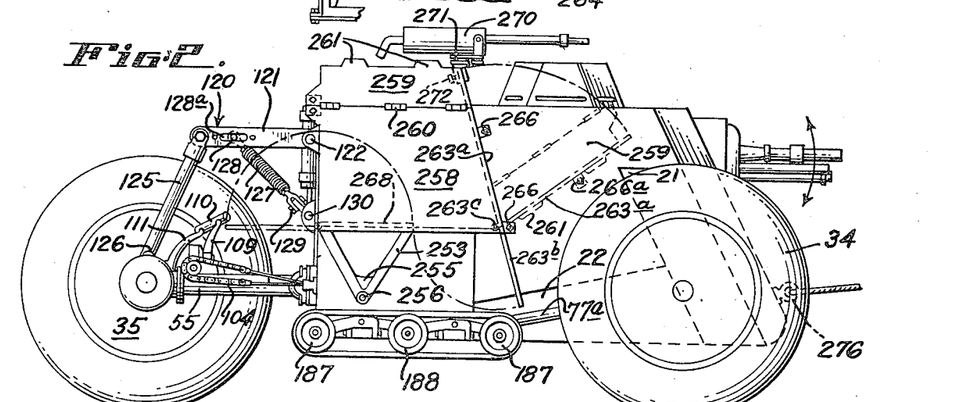
Fig. 2 is a side elevation of the tank apparatus.

Referring to Fig. 2, the side pannier may also be made into an improvised ambulance, not perfect for the purpose but suitable and very valuable under emergency conditions. This is accomplished by raising the lower section 263ᵇ of the front wall into a horizontal plane substantially level with seat 268 and unfolding the seat 268 to an extended position as shown in dotted lines in Fig. 2, and also tilting the upper portion 263ᵃ of the front wall of the pannier to a forwardly inclined position on the bolt and flange 266 and rebolting the plate 263 in a forwardly inclined position on a stud 266ᵃ. In this position, the upper side plate 259 may be detached by pulling the pintles of hinges 260 and inserting the top edge lugs 261 into the slots 265 of the adjusted inclined front plate, so as to provide side protection to the inclined adjusted portion of the front plate 263ᵃ.

By using a simple, light compact seat, seat back, and spring, an additional man can be carried on each side of the rear of the tank, immediately in the rear of each pannier. One end of a flat length of spring steel 251ᵃ is inserted into the rectangular slots cut into the front and rear angle members of the frame 251 and is locked by the two quickly detachable pins 251ᵇ. The other end of the spring supports a seat 251ᶜ of motorcycle type which carries a hinged back rest 251ᵈ. The man riding in this seat is partially protected by the tank and pannier armor. A man so transported may find a hand-hold on arm 249 if the tank is speeding or traversing rough ground, and he may rest his feet on trench crosser 185. By simply withdrawing spring 251ᵃ, reversing its angularity and returning and re-locking it to the slots, with the seat back folded parallel to the seat, it will be conveniently carried, out of the way, and within the limits of the side walls of the tank when the pannier is in its folded or up position.

It is to be understood that a suitable fuel supply is carried by the vehicle in a properly located tank 270 which is herein conventionally shown at one end of the motor unit 46, and that suitable motor, transmission controls, etc., and necessary air, exhaust or water pipes and ducts be provided for proper operation.

It is also to be understood that a suitable supply of ammunition would be carried by the tank in wall racks where convenient and also, as is here illustrated, by providing for a door 271 in the compartment wall 23, said door leading into the storage compartment 272 which has a floor 273 hingedly connected to wall 23 as at 274. The floor 273 of the storage compartment rests on a stop block 275, and is preferably filled with a heat resisting material so as to insulate the compartment from the heat of the motor unit.

At the front end of the tank body an eyelet 276 may be provided so that the tank may be hauled of pulled out of mire, etc., by man-power or other suitable means. This also permits towing trailers, trucks, and the like by means of the eyelet 276 by reversing the normal direction of driving and thereby making the normal rear drive wheel into the front wheel.

I claim:

1. In a mobile military tank, an amored body having an operator's compartment provided with a forward wall inclined rearwardly from bottom to top, said forward wall having an opening to receive a gun mount, said body having an inset at a forward portion of each of its side walls, said insets being of lesser length than the height of said side walls and terminating short of the top thereof providing an elongated inset having an upper shoulder whereby said body may be supported upon detachable wheel suspension means mounted in said insets.

2. In a military tank, an amored body having the elements of claim 1 and in which the side insets are inclined rearwardly from bottom to top.

3. In a military tank, an armored body having the elements of claim 1 and in which the rear portion of the body has an extended width at the lower portion of each of its opposite longitudinal sides adapted for providing seats which may be enclosed by armored panniers.

4. In a mobile military tank, an amored body having at its forward portion an operator's compartment of one width and having its rearward portion extended laterally transversely on each side of the body to a greater width than the operator's compartment, said extended portions comprising panniers having a bottom, armored front and exterior side walls, said front wall having hinged mounting relative to said bottom wall whereby said front wall may be tilted forwardly, the side wall of the operator's compartment being adapted for supporting the pannier front wall at its forwardly tilted position.

5. In a military tank, a body having the elements of claim 4, and in which the front wall of the pannier extends below the bottom wall of the pannier and is provided with stirrup openings, said bottom wall having an opening therethrough adjacent said front wall, whereby a person riding in the pannier and seated on the bottom thereof, may place his legs through the opening with his feet supported in said stirrups of the front plate.

6. In a mobile military tank, an armored body having at its forward portion an operator's compartment of one width, and having its rearward portion extending laterally transversely on each side of the body to a greater width than the operator's compartment, said extended portions comprising removable panniers having a hingedly mounted bottom and removable armored front and exterior side walls, said front wall of the pannier extending below the bottom wall of the pannier and being provided adjacent its lower end with stirrup openings, the forward wall being spaced from the forward portion of the bottom wall providing an opening rearwardly of the front wall, whereby a person riding in the pannier and seated on the bottom wall thereof may place his legs through the opening and support his feet in the said stirrups.

7. In a mobile military tank, an armored body having at its forward portion an operator's compartment of one width and having its rearward portion extended laterally transversely on each side of the body to a greater width than the operator's compartment, said extended portions comprising panniers having a bottom, armored front and exterior side walls, said front wall having hinged mounting relative to said bottom wall whereby said front wall may be tilted forwardly, and means to support the front wall in a forwardly tilted position.

CLEVE F. SHAFFER.